US012761393B2

(12) United States Patent
Shi et al.

(10) Patent No.: US 12,761,393 B2
(45) Date of Patent: Oct. 13, 2026

(54) RESERVOIR TURNING BANDS SIMULATION WITH DISTRIBUTED COMPUTING

(71) Applicant: Landmark Graphics Corporation, Houston, TX (US)

(72) Inventors: Genbao Shi, Sugar Land, TX (US); Kurt Alan Ranzinger, Erie, CO (US)

(73) Assignee: Landmark Graphics Corporation, Houston, TX (US)

( * ) Notice: Subject to any disclaimer, the term of this patent is extended or adjusted under 35 U.S.C. 154(b) by 1100 days.

(21) Appl. No.: 17/646,705

(22) Filed: Dec. 31, 2021

(65) Prior Publication Data

US 2023/0213685 A1 Jul. 6, 2023

(51) Int. Cl.
*G01V 20/00* (2024.01)
*G06F 30/20* (2020.01)
*G06F 111/08* (2020.01)

(52) U.S. Cl.
CPC .............. *G01V 20/00* (2024.01); *G06F 30/20* (2020.01); *G06F 2111/08* (2020.01)

(58) Field of Classification Search
CPC .... G01V 20/00; G01V 2210/665; G01V 1/28; G01V 1/30; G01V 2210/66; G06F 30/20; G06F 2111/08; G06F 30/25; G06F 30/27; G06F 30/28; G06F 2111/00–2119/22
See application file for complete search history.

(56) References Cited

U.S. PATENT DOCUMENTS

2006/0058965 A1 3/2006 Ricard et al.
2017/0011089 A1 1/2017 Bermudez Rodriguez et al.
2021/0374306 A1 12/2021 Bardy et al.

FOREIGN PATENT DOCUMENTS

WO WO2012003007 * 1/2012 ............... G06F 9/44
WO 2021040790 A1 3/2021

OTHER PUBLICATIONS

Emery et al. “TBSIM: A computer program for conditional simulation of three-dimensional Gaussian random fields via the turning bands method” Computers & Geosciences vol. 32 (2006) pp. 1615-1628 (Year: 2006).*

(Continued)

*Primary Examiner* — Emerson C Puente
*Assistant Examiner* — Alfred H B Wechselberger
(74) *Attorney, Agent, or Firm* — DeLizio, Peacock, Lewin and Guerra, LLP

(57) ABSTRACT

Some implementations relate to a method for parallelizing, by a geological data system, operations of a geostatistical simulation for a well data set via a plurality of processing elements (PEs). The method may include determining a reservoir area for the well data set. The method may include determining a set of turning band lines for the reservoir area. The method may include dividing the reservoir area into a plurality of tiles, each tile including a respective subset of the set of turning band lines. The method may include assigning at least one of the tiles to each of the PEs. The method may include determining, in parallel for each tile, intermediate results with respect to each respective subset of turning band lines. The method may include aggregating the intermediate results to form a final result of the geostatistical simulation.

18 Claims, 9 Drawing Sheets

(56) References Cited

OTHER PUBLICATIONS

Gribov, A. “A Turning Band Approach to Kernel Convolution for Arbitrary Surfaces” arXiv:1509.01745v1 [stat.CO] Sep. 5, 2015 (Year: 2015).*
Emery et al. “Truncated Gaussian simulation of discrete-valued, ordinal coregionalized variables” Computers &Geosciences vol. 36 (2010) pp. 1325-1338 (Year: 2010).*
Mantoglou et al. “The Turning Bands Method for Simulation of Random Fields Using Line Generation by a Spectral Method” Water Resources Research, vol. 18, No. 5, pp. 1379-1394, Oct. 1982 (Year: 1982).*
Zhang, et al. “Shuffle-Efficient Distributed Locality Sensitive Hashing on Spark” IEEE Infocom 2016 Poster Presentation [retrieved on Mar. 7, 2026] (Year: 2016).*
Hu, L. “Gradual Deformation and Iterative Calibration of Gaussian-Related Stochastic Models” Mathematical Geology, vol. 32, No. 1, 2000 [retrieved on Mar. 4, 2026] (Year: 2000).*
Burstedde, et al. “Enhancing speed and scalability of the ParFlow simulation code” arXiv:1702.06898v2 [cs. MS] [retrieved on Mar. 4, 2026] (Year: 2017).*
“PCT Application No. PCT/US2021/073209, International Search Report and Written Opinion”, Sep. 21, 2022, 10 pages.
Brooker, “Two-Dimensional Simulation by Turning Bands”, Journal of the International Association for Mathematical Geology, vol. 17, No. 1, Jan. 1, 1985, 11 pages.

* cited by examiner

RESERVOIR TURNING BANDS SIMULATION WITH DISTRIBUTED COMPUTING

BACKGROUND

The disclosure generally relates to the field of geostatistics, data processing, and modeling.

Geostatistical simulations comprise a set of techniques that use uncertainty in spatial estimation to capture the heterogeneous properties of geological reservoir formations. Some geostatistical simulations generate a stochastic (random) process that extends known reservoir data to formation property values at unknown locations.

DESCRIPTION

The description that follows includes example systems, methods, techniques, and program flows that describe aspects of the disclosure. However, it is understood that this disclosure may be practiced without these specific details. For instance, this disclosure refers to reservoir modeling in illustrative examples. Aspects of this disclosure can be instead applied to other types of models involving spatiotemporal datasets. In other instances, well-known instruction instances, protocols, structures, and techniques have not been shown in detail to avoid confusion.

Some geological data systems have been developed to perform geostatistical reservoir simulations on geological data sets. Such a geological data system may process certain operations of a geostatistical simulation (hereinafter "simulation") in parallel, such as on multiple processors of a single computer system or on a plurality of distributed computer systems. The geological data system may achieve parallelism by dividing the geological data set into subsets where each subset is processed in parallel with the others. After processing each subset in parallel, the geological data system may combine results for each subset to form a result for the simulation. The geological data system may present a graphical representation of the simulation result, such as by presenting a map indicating various facies (e.g., characteristics of formations) associated with a given space in the earth. Scientists and engineers may use the map to inform decisions related to oil production.

Figure 1A:
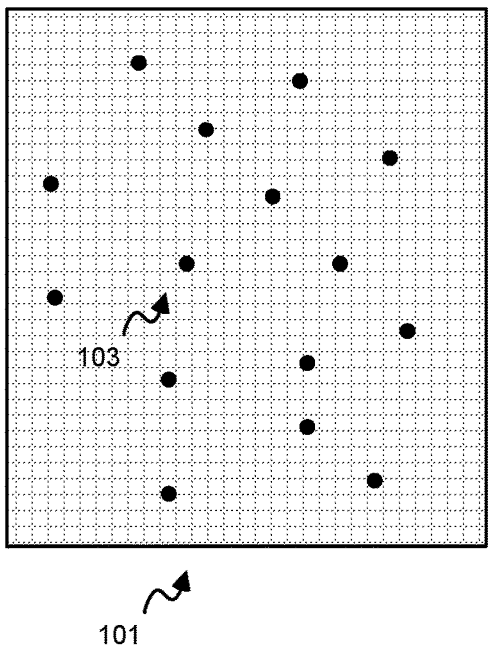
FIGS. 1A-1E include diagrams illustrating how a graphical representation of a simulation result may include artifacts indicating how a well data set was divided.
Figure 1B:
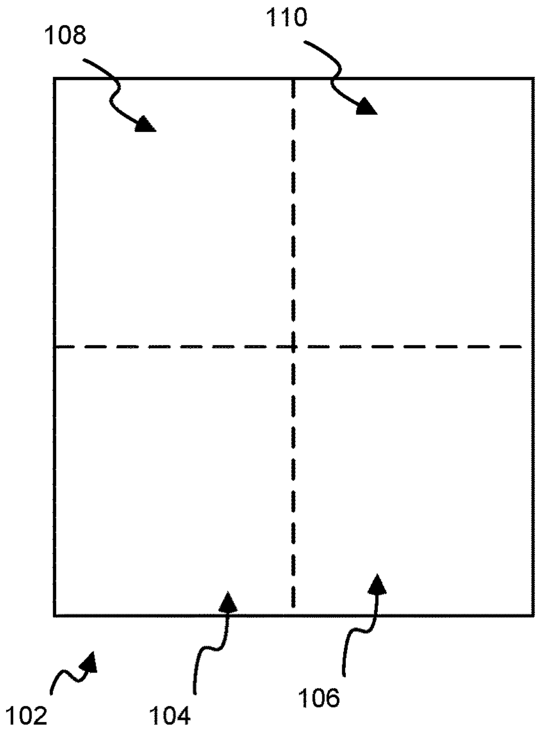
Figure 1C:
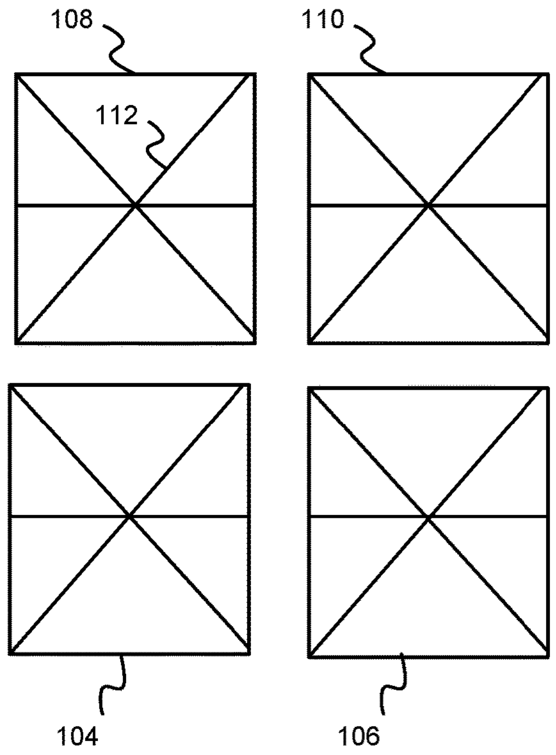
Figure 1D:
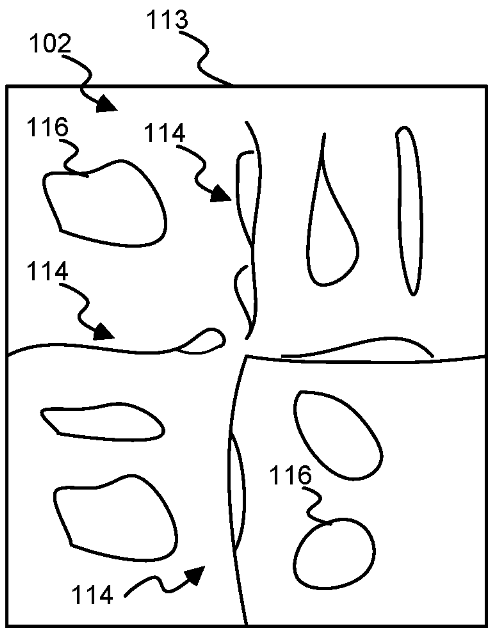
Figure 1E:
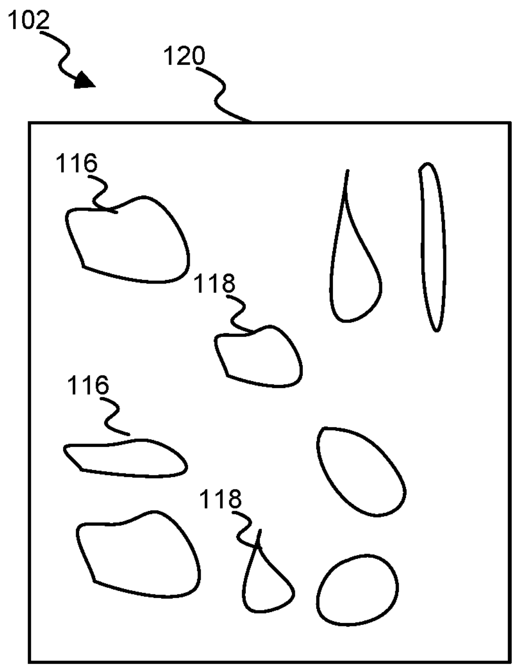

As noted, a geological data set (such as data values associated with a space in the earth) may be subdivided to parallelize operations of a simulation. Unfortunately, such parallelism may produce simulation results that contain artifacts relating to how the geological data set was subdivided. For example, a graphical image of the simulation result, such as a map, may include graphical artifacts indicating how the geological data set was subdivided. FIGS. 1A-1E include diagrams illustrating how a graphical representation of a simulation result may include artifacts indicating how a well data set was divided. FIG. 1A shows a well data set 101 including data points 103 derived from instrument readings taken from a space in the earth. FIG. 1B shows a reservoir area 102 that may be associated with one or more of the data points 103 of the well data set 101. A geological data system (not shown in FIGS. 1A-1E) may perform the simulation to estimate additional data points in the reservoir area 102. The simulation may be a truncated Gaussian simulation or any other suitable simulation. To achieve parallelism in the simulation, the geological data system may divide the reservoir area 102 into tiles 104, 106, 108, and 110. As shown in FIG. 1C, the geological data system also may determine turning band lines 112 for each tile. The turning band lines 112 may originate at a central point of the tile, where each turning band line 112 radiates outwardly from the central point. The simulation may include computations that relate to the turning band lines 112 of each tile. The geological data system may perform the computations for each tile in parallel, such as by distributing the computations for each tile to a separate computer system. The geological data system may combine the results for each tile to form a result for the simulation. The simulation result may be graphically presented as a map of facies associated with the reservoir area 102. FIG. 1D shows an example map 113 indicating facies 116 in the reservoir area 102. The map 113 may include artifacts 114 (i.e., graphical indicia) along the spatial lines on which the reservoir area 102 was divided into the tiles 104, 106, 108, and 110. Some implementations of this disclosure (described in more detail below) avoid such artifacts while still achieving parallelism for the simulation. For example, FIG. 1E shows an example map 120 from a simulation, where there are no artifacts related to how the well data set 101 may have been divided for the simulation. The map 120 may include additional facies 118 that were not included in the map 113. Hence, the map 120 may be a more accurate representation of facies associated with the reservoir area 102. The following discussion will provide more detail about how some implementations perform operations of a simulation in parallel.

Example Implementations

Figure 2:
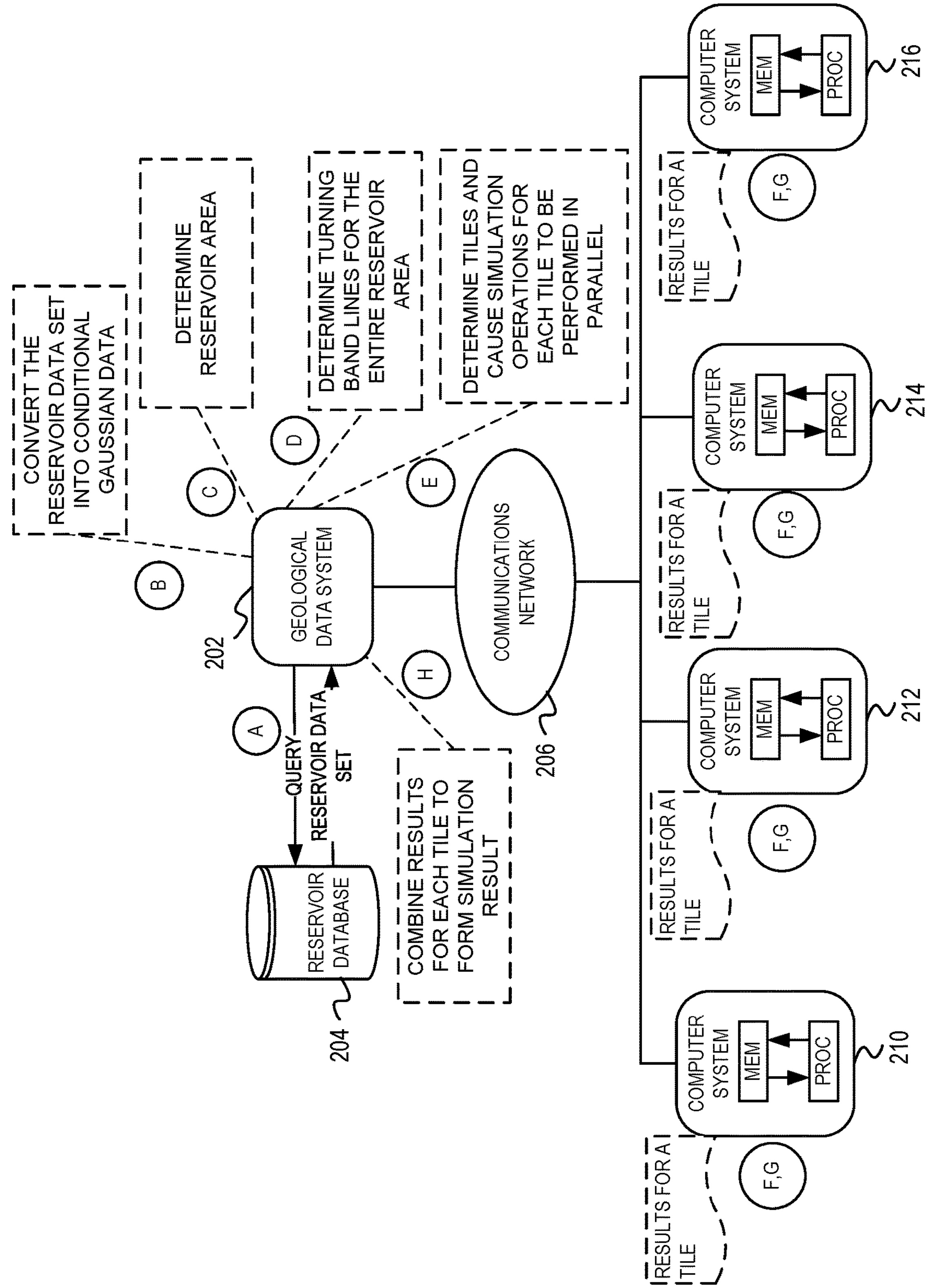
FIG. 2 is a block diagram illustrating an example system for performing operations of a simulation in parallel.
Figure 3A:
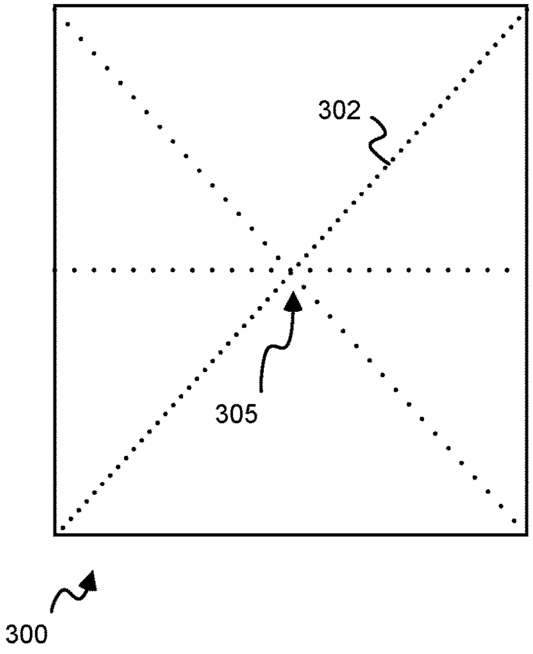
FIG. 3A is a diagram illustrating turning bands for a reservoir area.

FIG. 2 is a block diagram illustrating an example system for performing operations of a simulation in parallel. In FIG. 2, the operations are shown as stages A-I. During stage A, a geological data system 202 may request and receive a reservoir data set from a reservoir database 204. During stage B, the geological data system 202 may utilize a converter (not shown) to convert the reservoir data set into conditional Gaussian data. The computer systems 210, 212, 214, and 216 may later use the conditional Gaussian data and the converter in operations related to a distributed truncated Gaussian simulation. During stage C, the geological data system 202 may determine a reservoir area 300 associated with the reservoir data set. During stage D, the geological data system 202 may determine turning band lines for the entire reservoir area. FIG. 3A is a diagram illustrating turning band lines for a reservoir area. As shown, the turning band lines 302 may originate at a central point 305 of the reservoir area 300 and radiate outwardly to the bounds of the reservoir area 300. The reservoir area 300 may represent any suitable n-dimensional space (e.g., a two-dimensional space, a three-dimensional space, etc.) and the turning band lines 302 may occupy one or more of planes in the reservoir area 300.

Figure 3B:
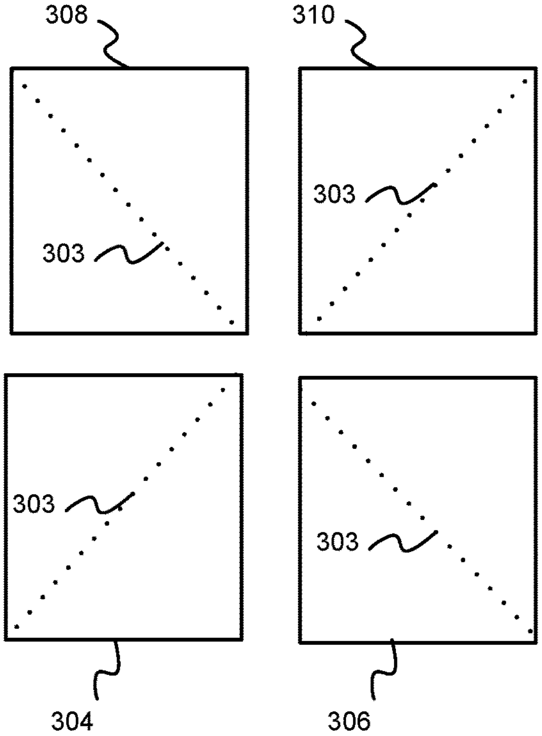
FIG. 3B illustrates an example in which each tile includes a turning band line.

During stage E, the geological data system 202 may divide the reservoir area 300 into tiles. Each tile may represent a space (e.g., an area) within the reservoir area. In the example shown in FIG. 1B, the reservoir area 102 is divided into four tiles 104, 106, 108, and 110. However, the reservoir area 300 may be divided into any suitable number of tiles. As discussed above (per stage C), the geological data system 202 may determine turning band lines for the entire reservoir area 300 (e.g., see FIG. 3A). Hence, each tile may include one or more of those turning band lines. FIG. 3B illustrates an example in which each tile includes a turning band line. In FIG. 3B, each of the tiles 304, 306, 308, 310 includes a different turning band line 303, which is a respective one of the plurality of the turning band lines 302 for the reservoir area 300.

Additionally, during stage E, the geological data system 202 may cause simulation operations for each tile to be performed in parallel. In some implementations, the geological data system 202 may transmit information associated with each tile (e.g., information representing each tile, one or more turning band lines associated with each tile, parameters for each tile, etc.) to remote computer systems that may perform simulation operations in parallel for each tile. The information may include the conditional Gaussian data (see stage B). The geological data system 202 also may make the converter available to the computer systems 210, 212, 214, and 216 (such as by exposing an application programming interface, transmitting executable code comprising the converter, etc.). As an example of stage E, for the four tiles 304, 306, 308, and 310, the geological data system 202 may transmit information associated with a first tile 304 to the computer system 210, information associated with a second tile 306 to the computer system 212, information associated with a third tile 308 to the computer system 214, and information associated with a fourth tile 310 to the computer system 216. In contrast to the example shown in FIG. 2, some implementations may achieve parallelism on components that are local to the geological data system 202. For example, the geological data system may perform computations for each tile on a separate local processor (not shown). In such an example, the geological data system 202 may include four processors (not shown), each performing operations on a tile in parallel with the others.

During stage F, each respective computer system may determine results for its respective tile. The operations of stage F may include determining, by each respective computer system, a simulated Gaussian field associated with a turning band line of the tile. The operations of stage F also may include converting the simulated Gaussian field into facies and/or a discrete distribution. During stage G, each of the computer systems 210, 212, 214, and 216 may transmit their respective results back to the geological data system 202. During stage H, the geological data system 202 combines results for each tile (referred to herein "intermediate results") to form a result for the simulation. The geological data system 202 also may present a graphical representation of the simulation result, such as by presenting a map of facies associated with a space in the earth. The graphical representation resulting from the operations shown in FIG. 2 does not include artifacts indicating how the reservoir data set was divided. For example, referring back to FIG. 1E, the map 120 provides a graphical illustration of facies 116 and 118 associated with the reservoir area 102, but does not include artifacts related to how the reservoir data set was divided.

Figure 4:
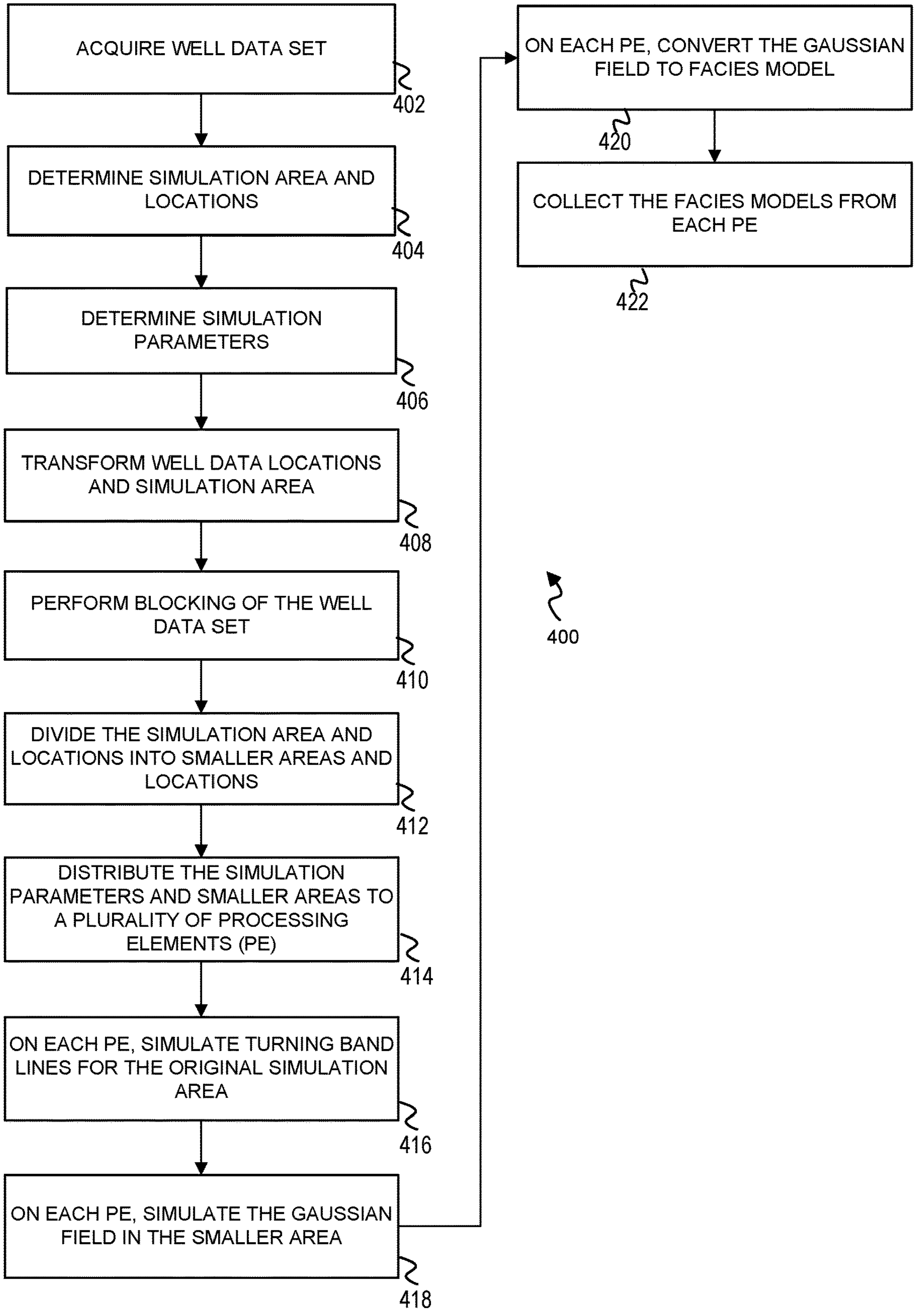
FIG. 4 is a flow diagram illustrating operations for performing a simulation, where some of the operations are performed in parallel.

FIG. 4 is a flow diagram illustrating operations for performing a simulation, where some of the operations are performed in parallel. The simulation may be a truncated Gaussian simulation or any other suitable simulation that utilizes turning band lines. In some implementations, the operations of the flow diagram 400 may be performed on multiple processors or cores of a single computer system. The single computer system may include a single memory structure that is shared by the multiple processors. Alternatively, in some implementations, the operations of the flow diagram 400 may be performed on multiple independent computer systems. In FIG. 4, operations begin at block 402.

At block 402, a geological data system may acquire a well data set. The well data set may include data taken at particular locations in the earth by instruments residing at or about those locations. The flow continues at block 404.

At block 404, the geological data system may determine a simulation area and locations for the simulation. The simulation area may be referred to as a reservoir area, where the locations reside in the reservoir area. The flow continues at block 406.

At block 406, the geological data system may determine simulation parameters. The simulation parameters may include a variogram model and any other suitable information. The operations of block 406 also may include determining Gaussian conditional data for the well data set. The flow continues at block 408.

At block 408, the geological data system may transform well data locations and the simulation area from a three-dimensional space into a one-dimensional space. The flow continues at block 410.

At block 410, the geological data system may perform blocking of the well data set. Blocking the well data set may coarsen the granularity of the well data set. The flow continues at block 412.

At block 412, the geological data system may divide the simulation area and locations into smaller areas and locations. The smaller areas may be referred to as tiles. The geological data system may divide the simulation area into any suitable number of tiles. Although the example described above relates to four tiles, the geological data system can divide the simulation area into any suitable number of tiles. The flow continues at block 414.

At block 414, the geological data system may distribute the simulation parameters and smaller simulation areas to a plurality of processing elements. In some implementations, the processing elements include a plurality of processors native to the geological data system. For example, the geological data system may include four microprocessors and a memory structure shared by the microprocessors. The geological data system may distribute the simulation parameters and tiles to each of the four microprocessors. In some implementations, some or all of the native processors receive more than one tile. In other implementations, the processing elements include remote computer systems external to the geological data system. The geological data system may utilize any suitable control mechanism for distributing the simulation parameters and tiles to the processing elements. For example, the geological data system may utilize Apache Spark to distribute the simulation parameters and tiles to a plurality of processing elements. In some implementations, the operations at block 414 also include the geological data system making a converter available to the processing elements, where the converter is configured to convert data into Gaussian conditional data. The flow continues at block 416.

At block 416, each processing element may simulate turning band lines for the original simulation area. For example, each processing element may simulate turning band lines for the entire reservoir area that was determined at block 404. By simulating turning band lines for the entire reservoir area, each tile will include a subset of all the turning band lines (e.g., see FIG. 3B). The flow continues at block 418.

At block 418, each processing element may simulate a Gaussian field in the smaller simulation area (i.e., tile) that was assigned to the processing element (i.e., assigned at block 414). The flow continues at block 420.

At block 420, each processing element may convert the Gaussian field to a facies model. Each processing element may use the converter that was made available by the geological data system. The flow continues at block 422.

At block 422, the geological data system may collect the facies models from each processing element. After collecting the facies models from each processing element, the geological data system may present a graphical representation indicating a result of the simulation. The graphical representation may include a map of facies for the reservoir area. After block 422, the flow ends.

The flowcharts are provided to aid in understanding the illustrations and are not to be used to limit the scope of the claims. The flowcharts depict example operations that can vary within the scope of the claims. Additional operations may be performed; fewer operations may be performed; the operations may be performed in parallel, and the operations may be performed in a different order. For example, the operations depicted in blocks 416, 418, and 420 can be performed in parallel or concurrently.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of a platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object-oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and/or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 5:
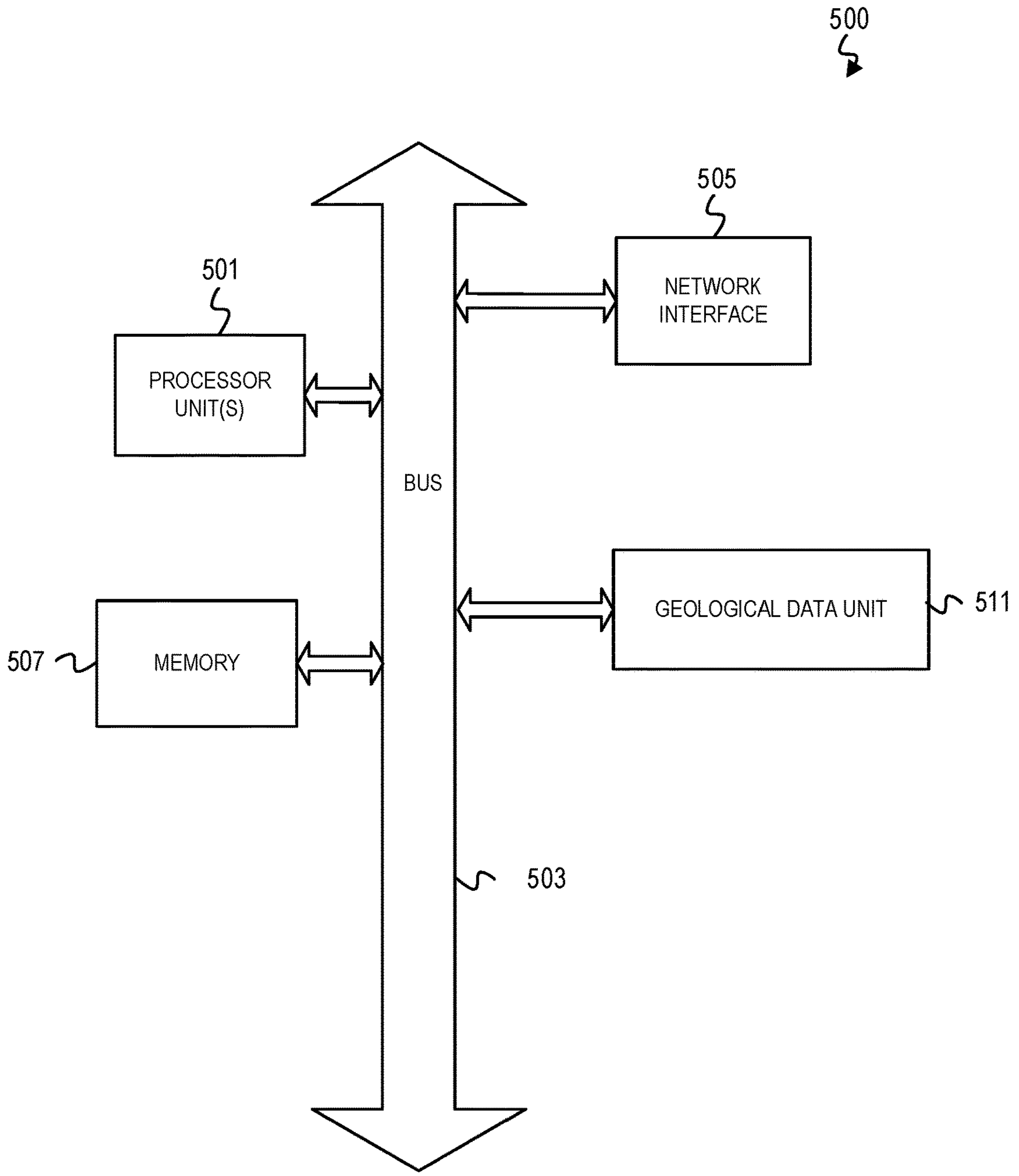
FIG. 5 depicts an example computer system configured to perform certain operations of a simulation in parallel.

FIG. 5 depicts an example computer system configured to perform certain operations of a simulation in parallel. The computer system 500 may include one or more processor units 501 (possibly including multiple cores, multiple nodes, and/or implementing multi-threading, etc.). The computer system 500 may include memory 507. The memory 507 may be system memory or any one or more of the above already described possible implementations of machine-readable media. The computer system 500 also may include a bus 503 and a network interface 505. The computer system 500 also may include a geological data unit 511 that may assign certain computations of a simulation to multiple processing elements (e.g., multiple processors, multiple cores, multiple remote computer systems, etc.) as described herein. The functionality described herein may be implemented with an application-specific integrated circuit, in logic implemented in the processor unit 501, in a co-processor on a peripheral device or card, etc. Further, implementations may include fewer or additional components not illustrated in FIG. 5 (e.g., video cards, audio cards, additional network interfaces, peripheral devices, etc.). The processor unit 501 and the network interface 505 may be coupled to the bus 503. Although illustrated as being coupled to the bus 503, the memory 507 may be coupled to the processor unit 501.

Figure 6:
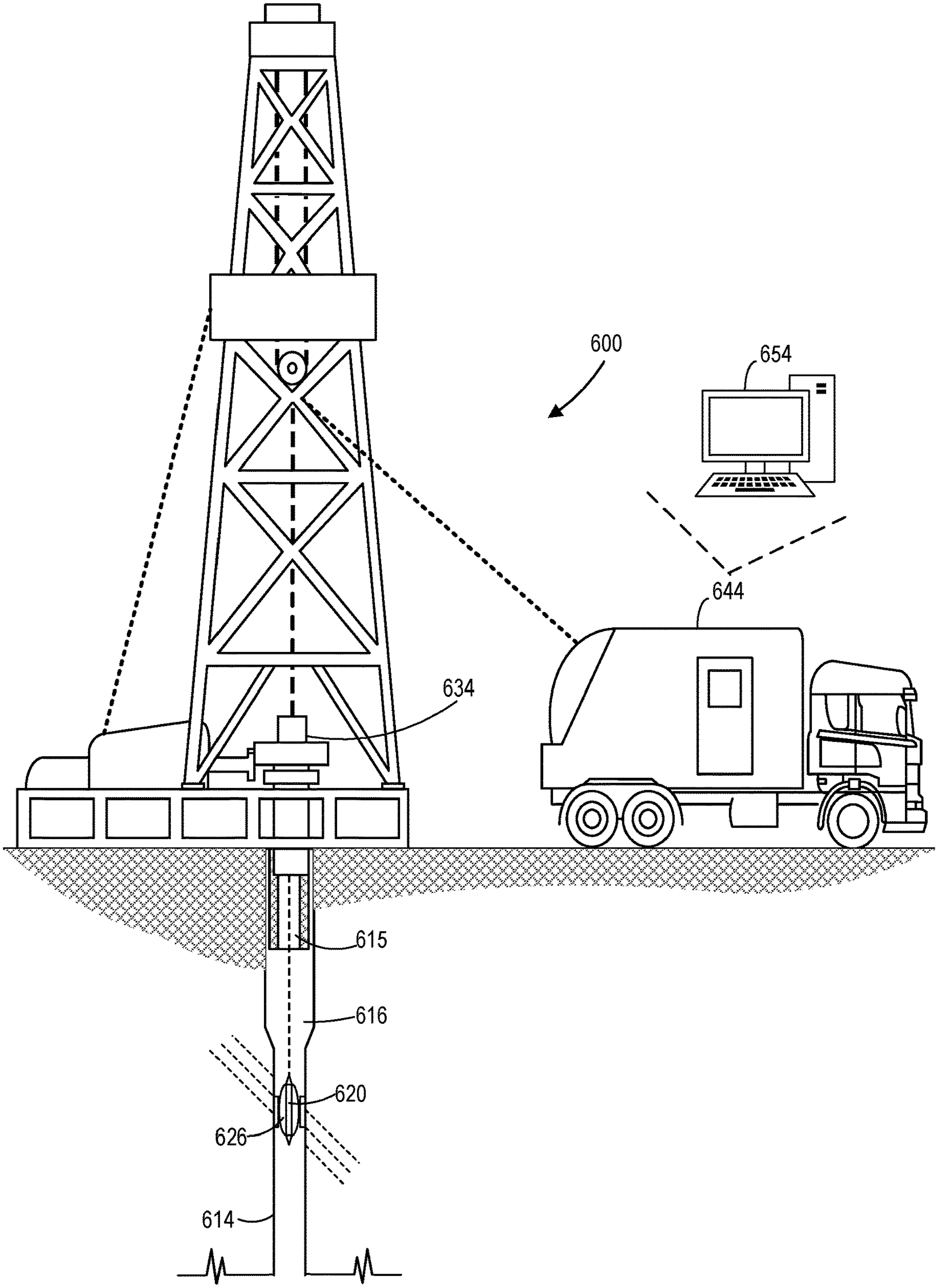
FIG. 6 depicts a schematic diagram of a wireline system with a reservoir modeling system that implements distributed computing.

FIG. 6 depicts a schematic diagram of a wireline system with a reservoir modeling system that implements distributed computing. A system 600 can be used in an illustrative logging environment with a drillstring removed, in accordance with some embodiments of the present disclosure.

Subterranean operations may be conducted using a wireline system 620 once the drillstring has been removed, though, at times, some or all of the drillstring may remain in a borehole 614 during logging with the wireline system 620. The wireline system 620 may include one or more logging tools 626 that may be suspended in the borehole 614 by a conveyance 616 (e.g., a cable, slickline, or coiled tubing). The logging tool 626 may be communicatively coupled to the conveyance 615. The conveyance 615 may contain conductors for transporting power to the wireline system 620 and telemetry from the logging tool 626 to a logging facility 644. The logging facility 644 comprises a geological data system 654 capable of achieving parallelism of operation in simulations (such as truncated Gaussian simulations) as described herein (e.g., with respect to FIGS. 1-4). Alternatively, the conveyance 615 may lack a conductor, as is often the case using slickline or coiled tubing, and the wireline system 620 may contain a control unit 634 that contains memory, one or more batteries, and/or one or more processors for performing operations and storing measurements.

In certain embodiments, the control unit 634 can be positioned at the surface, in the borehole (e.g., in the conveyance 615 and/or as part of the logging tool 626) or both (e.g., a portion of the processing may occur downhole and a portion may occur at the surface). The control unit 634 may include a control system or a control algorithm. In certain embodiments, a control system, an algorithm, or a set of machine-readable instructions may cause the control unit 634 to generate and provide an input signal to one or more elements of the logging tool 626, such as the sensors along the logging tool 626. The input signal may cause the sensors to be active or to output signals indicative of sensed properties. The logging facility 644 (shown in FIG. 6 as a truck, although it may be any other structure) may collect measurements from the logging tool 626, and may include computing facilities for controlling, processing, or storing the measurements gathered by the logging tool 626. The computing facilities may be communicatively coupled to the logging tool 626 by way of the conveyance 615 and may operate similarly to the control unit 634. In certain example embodiments, the control unit 634, which may be located in logging tool 626, may perform one or more functions of the computing facility.

The logging tool 626 includes a mandrel and a number of extendible arms coupled to the mandrel. One or more pads are coupled to each of the extendible arms. Each of the pads have a surface facing radially outward from the mandrel. Additionally, at least one a sensor is disposed on the surface of each pad. During operation, the extendible arms are extended outwards to a wall of the borehole to extend the surface of the pads outward against the wall of the borehole. The sensors of the pads of each extendible arm can detect image data to create captured images of the formation surrounding the borehole.

Figure 7:
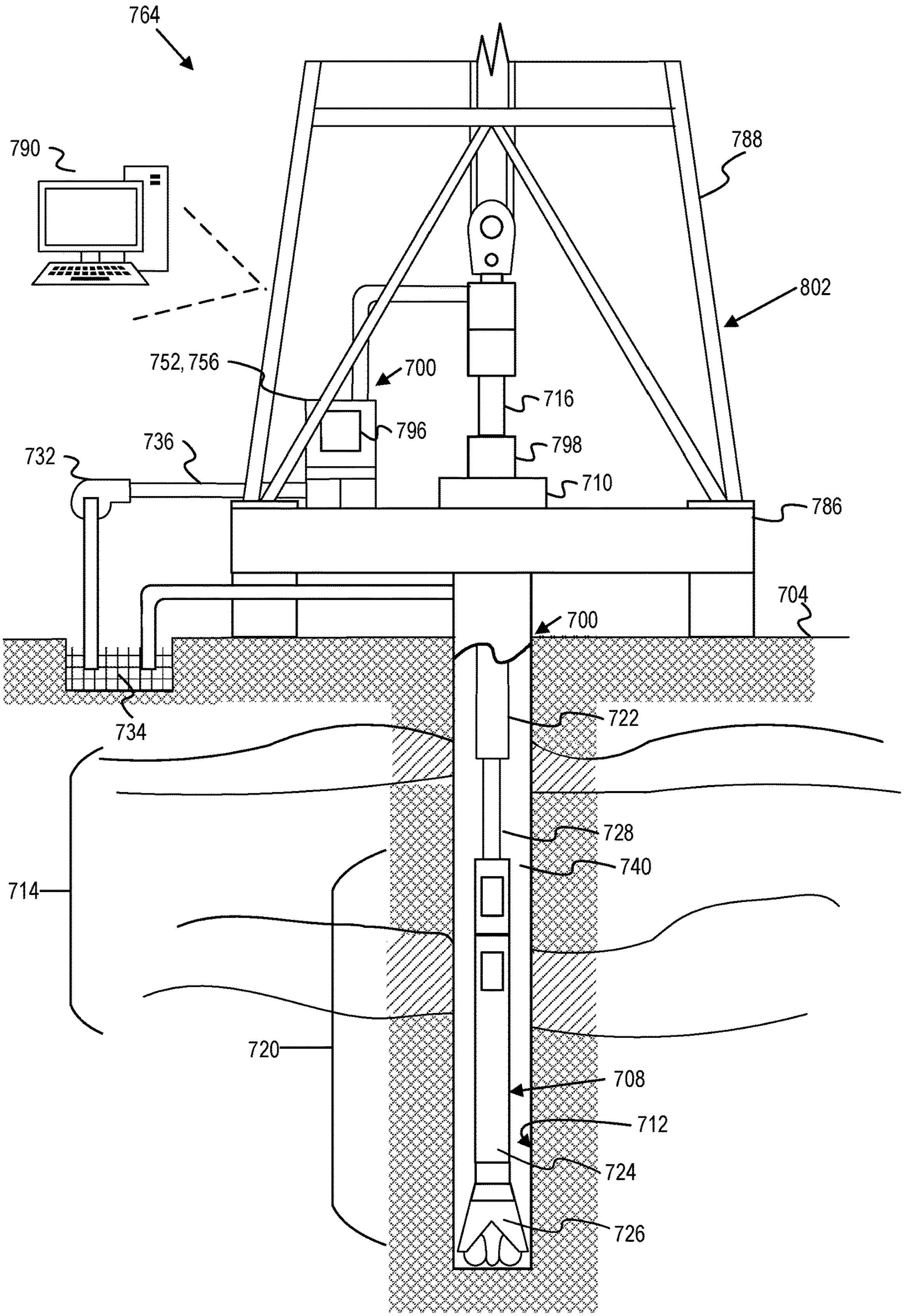
FIG. 7 is a schematic diagram of a drilling rig system with a reservoir modeling system that implements distributed computing.

FIG. 7 is a schematic diagram of a drilling rig system with a reservoir modeling system that implements distributed computing. For example, in FIG. 7 it can be seen how a system 764 may also form a portion of a drilling rig 702 located at the surface 704 of a well 706. Drilling of oil and gas wells is commonly carried out using a string of drill pipes connected together so as to form a drilling string 708 that is lowered through a rotary table 710 into a wellbore or borehole 712. Here a drilling platform 786 is equipped with a derrick 788 that supports a hoist. A geological data system 790 can be communicatively coupled to any measurement devices attached to the system 764 and can achieve parallelism in simulations as described above.

The drilling rig 702 may thus provide support for the drill string 708. The drill string 708 may operate to penetrate the rotary table 710 for drilling the borehole 712 through subsurface formations 714. The drill string 708 may include a Kelly 716, drill pipe 718, and a bottom hole assembly 720, perhaps located at the lower portion of the drill pipe 718.

The bottom hole assembly 720 may include drill collars 722, a down hole tool 724, and a drill bit 726. The drill bit 726 may operate to create a borehole 712 by penetrating the surface 704 and subsurface formations 714. The down hole tool 724 may comprise any of a number of different types of tools including MWD tools, LWD tools, and others.

During drilling operations, the drill string 708 (perhaps including the Kelly 716, the drill pipe 718, and the bottom hole assembly 720) may be rotated by the rotary table 710. In addition to, or alternatively, the bottom hole assembly 720 may also be rotated by a motor (e.g., a mud motor) that is located down hole. The drill collars 722 may be used to add weight to the drill bit 726. The drill collars 722 may also operate to stiffen the bottom hole assembly 720, allowing the bottom hole assembly 720 to transfer the added weight to the drill bit 726, and in turn, to assist the drill bit 726 in penetrating the surface 704 and subsurface formations 714.

During drilling operations, a mud pump 732 may pump drilling fluid (sometimes known by those of ordinary skill in the art as "drilling mud") from a mud pit 734 through a hose 736 into the drill pipe 718 and down to the drill bit 726. The drilling fluid can flow out from the drill bit 726 and be returned to the surface 704 through an annular area 740 between the drill pipe 718 and the sides of the borehole 712. The drilling fluid may then be returned to the mud pit 734, where such fluid is filtered. In some embodiments, the drilling fluid can be used to cool the drill bit 726, as well as to provide lubrication for the drill bit 726 during drilling operations. Additionally, the drilling fluid may be used to remove subsurface formation 714 cuttings created by operating the drill bit 726. It is the images of these cuttings that many embodiments operate to acquire and process.

Figure 8:
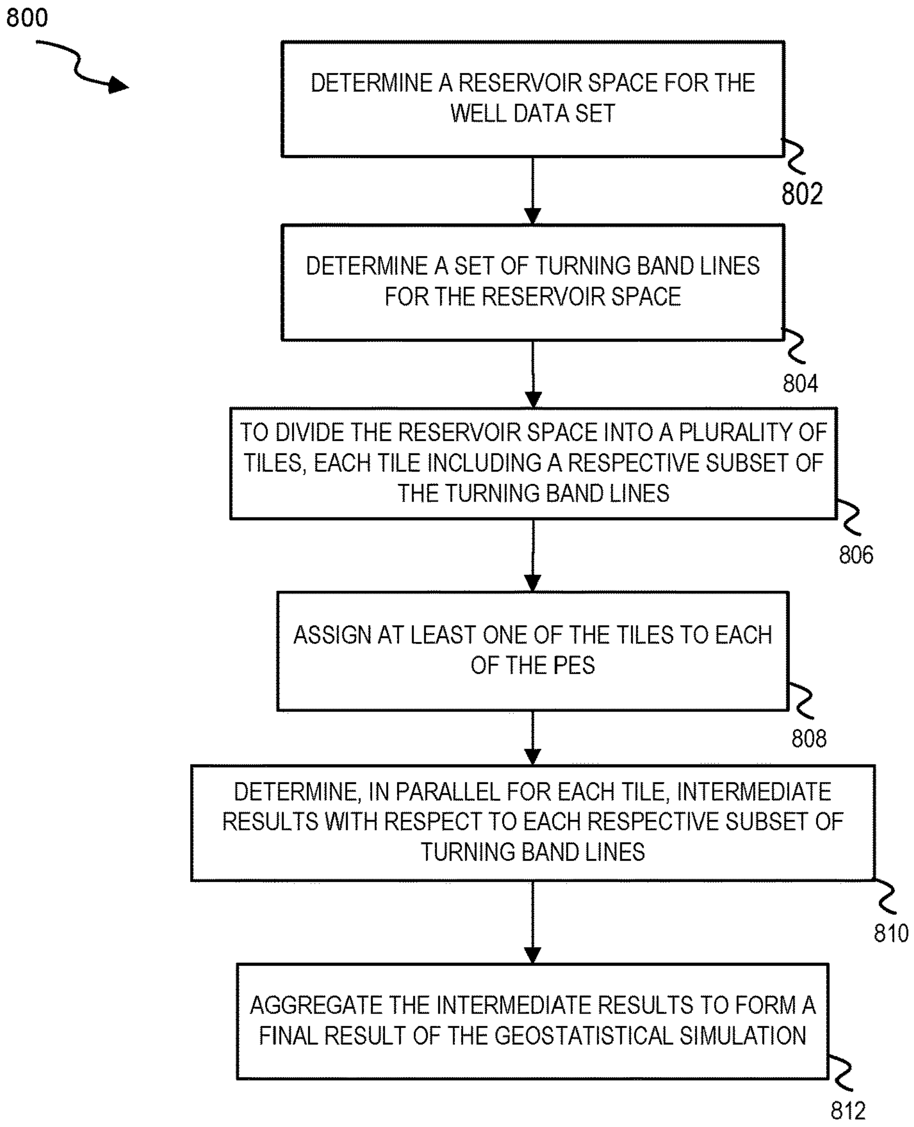
FIG. 8 is a flowchart of example operations for performing operations of a simulation in parallel.

FIG. 8 is a flowchart of example operations for parallelizing, by a geological data system, operations of a geostatistical simulation for a well data set via a plurality of processing elements (PEs). The operations may include determining a reservoir area for the well data set (block 802). The operations may include determining a set of turning band lines for the reservoir area (block 804). The operations may include dividing the reservoir space into a plurality of tiles, each tile including a respective subset of the turning band lines (block 806). The operations may include assigning at least one of the tiles to each of the PEs (block 808). The operations may include determining, in parallel for each tile, intermediate results with respect to each respective subset of turning band lines (block 810). The operations may include aggregating the intermediate results to form a final result of the geostatistical simulation (block 812).

While the aspects of the disclosure are described with reference to various implementations and exploitations, it will be understood that these aspects are illustrative and that the scope of the claims is not limited to them. In general, techniques for reservoir modeling as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Embodiment #1: A method for parallelizing, by a geological data system, operations of a geostatistical simulation for a well data set via a plurality of processing elements (PEs), comprising: determining a reservoir area for the well data set; determining a set of turning band lines for the reservoir area; dividing the reservoir area into a plurality of tiles, each tile including a respective subset of the set of turning band lines; assigning at least one of the tiles to each of the PEs; determining, in parallel for each tile, intermediate results with respect to each respective subset of turning band lines; aggregating the intermediate results to form a final result of the geostatistical simulation.

Embodiment #2: The method of Embodiment #1 further comprising: graphically presenting the final result of the geostatistical simulation as a map of facies associated with the reservoir area.

Embodiment #3: The method of any one of Embodiments #1-2, wherein each of the turning band lines emanates from a central point of the reservoir area.

Embodiment #4: The method of any one of Embodiments #1-3, wherein the PEs are native to the geological data system, and wherein the PEs utilize a shared memory structure native to the geological data system.

Embodiment #5: The method of any one of Embodiments #1-4, wherein each respective PE is part of a respective remote computer system.

Embodiment #6: The method of any one of Embodiments #1-5 further comprising: converting the well data set into conditional Gaussian data, wherein the geostatistical simulation is a truncated Gaussian simulation and the intermediate results represent simulated Gaussian fields; and converting, by each respective PE, the simulated Gaussian fields into one or more discrete distributions.

Embodiment #7: The method of any one of Embodiments #1-6, wherein each intermediate result is associated with a geostatistical simulation of a Gaussian field in the respective tile.

Embodiment #8: A non-transitory, computer-readable medium having instructions stored thereon that are executable by a geological data system for conducting a geostatistical simulation on a well data set, the instructions comprising: instructions to determine a reservoir area for the well data set; instructions to determine a set of turning band lines for the reservoir area; instructions to divide the reservoir area into a plurality of tiles, each tile including a respective subset of the turning band lines; instructions to assign at least one of the tiles to each of the PEs; instructions to determine, in parallel for each tile, intermediate results with respect to each respective subset of turning band lines; and instructions to aggregate the intermediate results to form a final result of the geostatistical simulation.

Embodiment #9: The computer-readable medium of Embodiment #8 further comprising: instructions to graphically present the final result of the geostatistical simulation as a map of facies associated with the reservoir area.

Embodiment #10: The computer-readable medium of any one of Embodiments #8-9, wherein the turning band lines emanate from a central point of the reservoir area.

Embodiment #11: The computer-readable medium of any one of Embodiments #8-10, wherein the PEs are native to the geological data system, and wherein the PEs utilize a shared memory structure native to the geological data system.

Embodiment #12: The computer-readable medium of any one of Embodiments #8-11, wherein each respective PE is part of a respective remote computer system.

Embodiment #13: The computer-readable medium of any one of Embodiments #8-12, further comprising: instructions to convert the well data set into conditional Gaussian data, wherein the geostatistical simulation is a truncated Gaussian simulation and the intermediate results represent simulated Gaussian fields; and instructions to convert, by each respective PE, the simulated Gaussian fields into one or more discrete distributions.

Embodiment #14: The computer-readable medium of any one of Embodiments #8-13, wherein each respective intermediate result is associated with a simulation of a Gaussian field in the respective tile.

Embodiment #15: An apparatus comprising: one or more processors; and a computer-readable medium having instructions stored thereon that are executable by the processor for conducting a geostatistical simulation on a well data set, the instructions including: instructions to determine a reservoir area for the well data set; instructions to determine a set of turning band lines for the reservoir area; instructions to divide the reservoir area into a plurality of tiles, each tile including a respective subset of the turning band lines; instructions to assign at least one of the tiles to each of a plurality of processing elements (PEs); instructions to determine, in parallel for each tile, intermediate results with respect to each respective subset of turning band lines; and instructions to aggregate the intermediate results to form a final result of the geostatistical simulation.

Embodiment #16: The apparatus of Embodiment #15 further comprising: instructions to graphically present the final result of the geostatistical simulation as a map of facies associated with the reservoir area.

Embodiment #17: The apparatus of any one of Embodiments #15-16, wherein the turning band lines emanate from a central point of the reservoir area.

Embodiment #18: The apparatus of any one of Embodiments #15-17, wherein the PEs include the one or more processors that are native to the apparatus.

Embodiment #19: The apparatus of any one of Embodiments #15-18, wherein each respective PE is part of a respective remote computer system.

Embodiment #20: The apparatus of any one of Embodiments #15-19, further comprising: instructions to convert the well data set into conditional Gaussian data, wherein the geostatistical simulation is a truncated Gaussian simulation and the intermediate results represent simulated Gaussian fields; and instructions to convert, by each respective PE, the simulated Gaussian fields into one or more discrete distributions.

What is claimed is:

1. A method for parallelizing, by a geological data system, operations of a geostatistical simulation for a well data set via a plurality of processing elements (PEs), comprising:

determining a reservoir area for the well data set;

determining a set of turning band lines for the reservoir area;

dividing the reservoir area into a plurality of tiles, each tile including a respective subset of the set of turning band lines;

assigning at least one of the tiles to each of the PEs;

determining, in parallel for each tile, intermediate results with respect to each respective subset of turning band lines;

aggregating the intermediate results to form a final result of the geostatistical simulation; and graphically presenting the final result of the geostatistical simulation as a map of facies associated with the reservoir area.

2. The method of claim 1, wherein each of the turning band lines emanate from a central point of the reservoir area.

3. The method of claim 1, wherein the PEs are native to the geological data system, and wherein the PEs utilize a shared memory structure native to the geological data system.

4. The method of claim 1, wherein each respective PE is part of a respective remote computer system.

5. The method of claim 1 further comprising:

converting the well data set into conditional gaussian data, wherein the geostatistical simulation is a truncated Gaussian simulation and the intermediate results represent simulated Gaussian fields; and converting, by each respective PE, the simulated Gaussian fields into one or more discrete distributions.

6. The method of claim 1, wherein each intermediate result is associated with a geostatistical simulation of a Gaussian field in the respective tile.

7. A non-transitory, computer-readable medium having instructions stored thereon that are executable by a geological data system for conducting a geostatistical simulation on a well data set via a plurality of processing elements (PEs), the instructions comprising:

instructions to determine a reservoir area for the well data set;

instructions to determine a set of turning band lines for the reservoir area;

instructions to divide the reservoir area into a plurality of tiles, each tile including a respective subset of the turning band lines;

instructions to assign at least one of the tiles to each of the PEs;

instructions to determine, in parallel for each tile, intermediate results with respect to each respective subset of turning band lines; and instructions to aggregate the intermediate results to form a final result of the geostatistical simulation; and instructions to graphically present the final result of the geostatistical simulation as a map of facies associated with the reservoir area.

8. The computer-readable medium of claim 7, wherein the turning band lines emanate from a central point of the reservoir area.

9. The computer-readable medium of claim 7, wherein the PEs are native to the geological data system, and wherein the PEs utilize a shared memory structure native to the geological data system.

10. The computer-readable medium of claim 7, wherein each respective PE is part of a respective remote computer system.

11. The computer-readable medium of claim 7, further comprising:

instructions to convert the well data set into conditional gaussian data, wherein the geostatistical simulation is a truncated Gaussian simulation and the *intermedia* results represent simulated Gaussian fields; and instructions to convert, by each respective PE, the simulated Gaussian fields into one or more discrete distributions.

12. The computer-readable medium of claim 7, wherein each respective intermediate result is associated with a simulation of a Gaussian field in the respective tile.

13. An apparatus comprising:

one or more processors; and a computer-readable medium having instructions stored thereon that are executable by the processor for conducting a geostatistical simulation on a well data set, the instructions including:

instructions to determine a reservoir area for the well data set;

instructions to determine a set of turning band lines for the reservoir area;

instructions to divide the reservoir area into a plurality of tiles, each tile including a respective subset of the turning band lines;

instructions to assign at least one of the tiles to each of a plurality of processing elements (PEs);

instructions to determine, in parallel for each tile, intermediate results with respect to each respective subset of turning band lines; and instructions to aggregate the intermediate results to form a final result of the geostatistical simulation; and instructions to graphically present the final result of the geostatistical simulation as a map of facies associated with the reservoir area.

14. The apparatus of claim 13, wherein the turning band lines emanate from a central point of the reservoir area.

15. The apparatus of claim 13, wherein the PEs include the one or more processors that are native to the apparatus.

16. The apparatus of claim 13, wherein each respective PE is part of a respective remote computer system.

17. The apparatus of claim 13, further comprising:

instructions to convert the well data set into conditional gaussian data, wherein the geostatistical simulation is a truncated Gaussian simulation and the *intermedia* results represent simulated Gaussian fields; and instructions to convert, by each respective PE, the simulated Gaussian fields into one or more discrete distributions.

18. The method of claim 1, wherein determining the set of turning-band lines comprises generating a plurality of turning-band lines that all originate from a single central point of the reservoir area and extend across boundaries of multiple tiles.

* * * * *